US006396486B1

(12) United States Patent
Kuo et al.

(10) Patent No.: US 6,396,486 B1
(45) Date of Patent: May 28, 2002

(54) PIXEL CLOCK GENERATOR FOR AUTOMATICALLY ADJUSTING THE HORIZONTAL RESOLUTION OF AN OSD SCREEN

(75) Inventors: Shih-Tsung Kuo, Taipei; Fu-Yuan Hsiao, Taipei Hsien, both of (TW)

(73) Assignee: Weltrend Semiconductor Inc., Hsinchu (TW)

( * ) Notice: Subject to any disclaimer, the term of this patent is extended or adjusted under 35 U.S.C. 154(b) by 0 days.

(21) Appl. No.: 09/326,796

(22) Filed: Jun. 4, 1999

(30) Foreign Application Priority Data

Apr. 1, 1999 (TW) .......................................... 88105227

(51) Int. Cl.$^7$ ................................................ G09G 3/36
(52) U.S. Cl. ...................................... 345/326; 345/722
(58) Field of Search .................... 348/21–25, 569; 345/9.1–9.5, 100, 101, 102, 204, 205, 213, 156–158, 719–723, 187

(56) References Cited

U.S. PATENT DOCUMENTS

| 5,534,942 | A | * | 7/1996 | Beyers, Jr. et al. | ......... | 348/569 |
| 5,579,057 | A | * | 11/1996 | Bauker et al. | ............... | 348/589 |
| 5,809,538 | A | * | 9/1998 | Pollmann et al. | ............ | 711/151 |
| 5,889,500 | A | * | 3/1999 | Chang et al. | .................. | 345/10 |
| 5,969,770 | A | * | 10/1999 | Hortoh | ........................ | 348/569 |
| 6,072,462 | A | * | 6/2000 | Moushovich | ................ | 345/141 |
| 6,181,353 | B1 | * | 1/2001 | Kuhisu | ........................ | 345/511 |
| 6,215,467 | B1 | * | 4/2001 | Suga et al. | .................. | 345/132 |
| 6,300,982 | B1 | * | 10/2001 | Koh | ............................ | 398/569 |
| 6,304,253 | B1 | * | 10/2001 | Sung et al. | .................. | 345/187 |

* cited by examiner

Primary Examiner—Steven Sax
(74) Attorney, Agent, or Firm—Winston Hsu

(57) ABSTRACT

The present invention provides a pixel clock generator for automatically adjusting the horizontal resolution of an OSD screen. The OSD screen is displayed on a displaying device, the displaying device comprises a screen and a display control circuit for displaying an image frame on the screen according to an incoming horizontal synchronous signals and horizontal image signals. The image frame comprises a plurality of horizontal image lines. Each of the horizontal image signals are used for forming one of the horizontal image lines of the image frame, and each of the horizontal synchronous signals comprises a scan signal and a retrace signal. The pixel clock generator comprising a phase locked loop (PLL) circuit and an adjusting circuit. The adjusting circuit has a control port for receiving a multiplier wherein the PLL circuit generates a quantity of the pixel clocks approximately equal to the multiplier within the receiving time period of each of the horizontal synchronous signals. The adjusting circuit has three input ports for receiving a predetermined horizontal resolution value, the horizontal synchronous signals, and the pixel clocks generated by the PLL circuit. The adjusting circuit generates the multiplier fed into the control port of the PLL circuit according to the inputs from the three input ports to make the quantity of the pixel clocks generated by the PLL circuit within the receiving time period of each of the scan signals approximately equal to the horizontal resolution value.

6 Claims, 5 Drawing Sheets

$$m_1 = \frac{t_1}{\frac{(t_1+t_2)}{N}} = \frac{t_1 \times N}{(t_1+t_2)} \quad \text{...............(1)}$$

$$m_2 = \frac{t_1}{\frac{(t_1+t_2)}{N+m_1}} = \frac{t_1 \times (N+m_1)}{(t_1+t_2)} = N\left[\frac{t_1}{t_1+t_2} + (\frac{t_1}{t_1+t_2})^2\right] \quad \text{...............(2)}$$

$$m_n = \frac{t_1}{\frac{(t_1+t_2)}{N+m_{n-1}}} = \frac{t_1 \times (N+m_{n-1})}{(t_1+t_2)}$$

$$= N\left[\frac{t_1}{t_1+t_2} + (\frac{t_1}{t_1+t_2})^2 + \ldots\ldots + (\frac{t_1}{t_1+t_2})^n\right] \quad \text{...............(3)}$$

$$M = \frac{t_1}{\frac{(t_1+t_2)}{N+m_{n-1}}} = \frac{t_1}{t_1+t_2} N\left[1 + \frac{t_1}{t_1+t_2} + (\frac{t_1}{t_1+t_2})^2 + \ldots\ldots\right]$$

$$= \frac{t_1}{t_1+t_2} N \times \frac{1}{1-\frac{t_1}{t_1+t_2}} = \frac{t_1}{t_2} N \quad \text{...............(4)}$$

$$\frac{t_1+t_2}{N+M} \cong \frac{t_1+t_2}{N(1+\frac{t_1}{t_2})} = \frac{t_2}{N} \quad \text{...............(5)}$$

Fig. 6

PIXEL CLOCK GENERATOR FOR AUTOMATICALLY ADJUSTING THE HORIZONTAL RESOLUTION OF AN OSD SCREEN

BACKGROUND OF THE INVENTION

1. Field of the Invention

The present invention relates to a pixel clock generator, and more particularly, to a pixel clock generator for automatically adjusting the horizontal resolution of an OSD screen to meet the multi-sync requirement for the display.

2. Description of the Prior Art

A display is an important computer peripheral device that converts image signals into display images for display on the screen. This permits the use of data generated in the computer. The On-Screen Display (OSD) has become a fundamental control unit of the display as it can be used to directly adjust various display parameters such as color, contrast, or brightness. An OSD screen is composed of vertical synchronous signals. Each vertical synchronous signal comprises a plurality of horizontal synchronous signals forming horizontal scanning lines. Each of the horizontal synchronous signals comprises a plurality of pixel clocks to form the pixels of a horizontal scanning line. A high number of pixel clocks indicates denser sampling of the horizontal image signal and therefore a higher horizontal resolution, whereas a smaller number of pixel clocks indicates sparse sampling of the horizontal image signal and therefore a lower horizontal resolution. If the prior art display with OSD is in a different mode, i.e. with different vertical synchronous signals and different horizontal synchronous signals, the horizontal resolution value and the initial point of the horizontal position have to be adjusted so as to set the OSD screen.

Please refer to FIG. 1 and FIG. 2. FIG. 1 is a functional block diagram of a pixel clock generator according to the prior art. FIG. 2 is a schematic timing diagram of the pixel clock generator 20 shown in FIG. 1. A pixel clock 18 is generated by a pixel clock generator 20 for sampling on a horizontal synchronous signal 14. Once the initial point of the horizontal position of an OSD screen is set, the OSD horizontal image signal 16 may be displayed on the screen from the initial point. The pixel clock generator 20 of the prior art uses a phase locked loop circuit 22 to generate a proper pixel clock 18. The phase locked loop circuit 22 comprises a control port 24 for receiving a multiplier N, an input port 26 for inputting a horizontal synchronous signal 14, and an output port 28 for generating a pixel clock 18. Multiplier N is the present resolution value. When stabilized, the phase locked loop circuit 22 generates pixel clocks 18 within the time period each of the horizontal synchronous signals is received with the number of pixel clocks 18 generated being a multiple of N (as shown in FIG. 2). The frequency of the output port 28 of the phase locked loop circuit 22 is approximately equal to N times that of the horizontal synchronous signal 14 of the input port 26. As shown in FIG. 2, the horizontal synchronous signal 14 comprises signals at two levels: high and low. The high level retrace signal denotes the required retracing time of the electron gun and the low level scan signal denotes the required scanning time of the electron gun. In other words, the horizontal scanning lines of the whole screen are generated within the time period of the scan signal of the horizontal synchronous signal 14 so the horizontal resolution of the actual image is determined only by the pixel clocks within the time period of the scan signal. So, according to the prior art method of sampling, the horizontal resolution and the initial position of the OSD screen have to be adjusted when in different modes. The present invention provides a simple method for automatic adjustment. The horizontal resolution and the horizontal initial position need not be adjusted.

Please refer to FIG. 3. FIG. 3 is a schematic diagram of the time sequence of the retrace signals of the horizontal synchronous signals 14 and the scan signals shown in FIG. 2. In FIG. 3, $t_1$ denotes the time required to retrace the electron gun in the horizontal synchronous signal, $t_2$ denotes the scanning time required by the electron gun, and $t_1+t_2$ denotes the time for inputting each horizontal synchronous signal 14. Each horizontal synchronous signal can be considered to be composed of a retrace signal 15 and a scan signal 17. When the pixel clock 18 remains unchanged, i.e. the horizontal resolution (N) of the image screen is fixed, and if the retrace time of the horizontal synchronous signal 14 changes from $t_1$ to $t_{1i}$, the initial point of the displaying position of the OSD screen on the displaying screen will change from point a to point a+b. That is to say, the OSD screen on the displaying screen will change i.e. the proportion of horizontal synchronous signals taken up by the retrace time will effect the real resolution. If changing the resolution of the display, the retrace signal time of the electron gun will change and the necessary scanning time of the electron gun needed will also change. Since their ratio will not be the same, the initial position of the OSD screen on the display will change.

If the horizontal resolution is N, it is necessary to take N samples within the time period $t_2$. If the horizontal resolution is changed to N+M, it is then necessary to take N+M samples within the time period $t_2$. However, in the actual application, the prior art sampling method takes N samples within the time period $t_1+t_2$, and when the horizontal resolution is changed to N+M, it takes N+M samples within the time period $t_1+t_2$. So the prior art method causes the initial position of the OSD screen to change along with the change of the horizontal resolution. If the user changes mode (i.e. the horizontal resolution changes) the OSD screen often moves causing inconvenience.

To solve this problem, a Look-Up Table is created in software and the displaying position of the OSD screen is adjusted according to the resolution in conjugation with the Look-Up Table so that the OSD screen does not change with different resolutions. This prior art method of adjusting the OSD screen is very troublesome because the Look-Up Table has to be altered to fit new displaying devices with many adjusting procedures.

SUMMARY OF THE INVENTION

It is therefore a primary objective of the present invention to provide a pixel clock generator for automatically adjusting the horizontal resolution of an OSD screen to solve the above mentioned problem in using hardware.

In a preferred embodiment, the present invention provides a pixel clock generator for controlling the resolution of horizontal image signals of a displaying device, the displaying device comprising a screen and a display control circuit for displaying an image frame on the screen according to an incoming image frame signal, each image frame comprising a plurality of horizontal image lines, the image frame signal comprising a plurality of horizontal synchronous signals and horizontal image signals, each of the horizontal image signals being used for forming one of the horizontal image lines of the image frame, each of the horizontal synchronous signals comprising a scan signal and a retrace signal, the scan signal being used for directing the display control circuit to convert one correspondent horizontal image signal into a horizontal image line on the screen, and the retrace signal being used for directing the display control circuit to prepare for displaying another horizontal image line, the pixel clock generator comprising:

a phase locked loop (PLL) circuit having an input port for receiving the horizontal synchronous signals and a control port for receiving a multiplier wherein the PLL circuit generates a quantity of the pixel clocks approximately equal to the multiplier within the receiving time period of each of the horizontal synchronous signals; and an adjusting circuit having three input ports for receiving a horizontal resolution value, the horizontal synchronous signals, and the pixel clocks generated by the PLL circuit wherein the adjusting circuit generates the multiplier fed into the control port of the PLL circuit according to the inputs from the three input ports to make the quantity of the pixel clocks generated by the PLL circuit within the receiving time period of each of the scan signals approximately equal to the horizontal resolution value.

It is an advantage of the present invention that the electron gun can still display the OSD screen in approximately the same position of the displaying device regardless of the resolution.

This and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 6 is the calculating formula of the pixel clock generator shown in FIG. 5.

DETAILED DESCRIPTION OF THE PREFERRED EMBODIMENT

Figure 1:
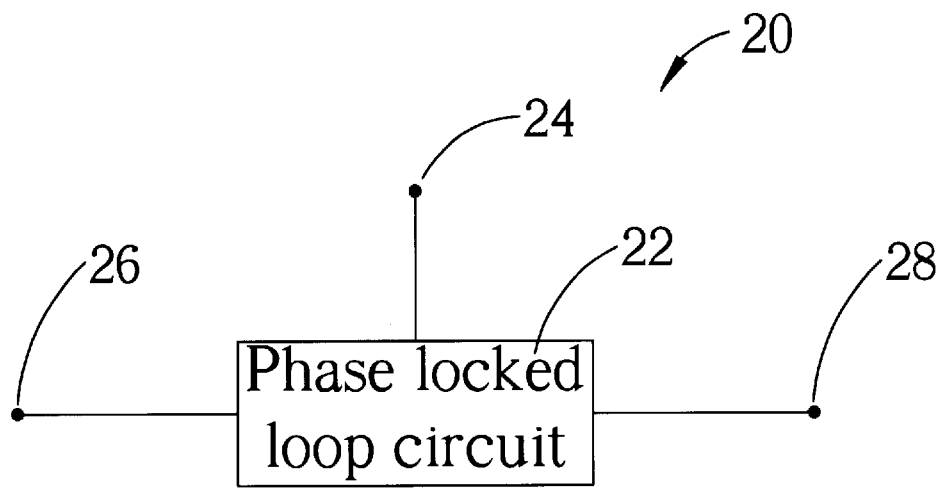
FIG. 1 is a functional block diagram of a pixel clock generator according to the prior art.
Figure 2:
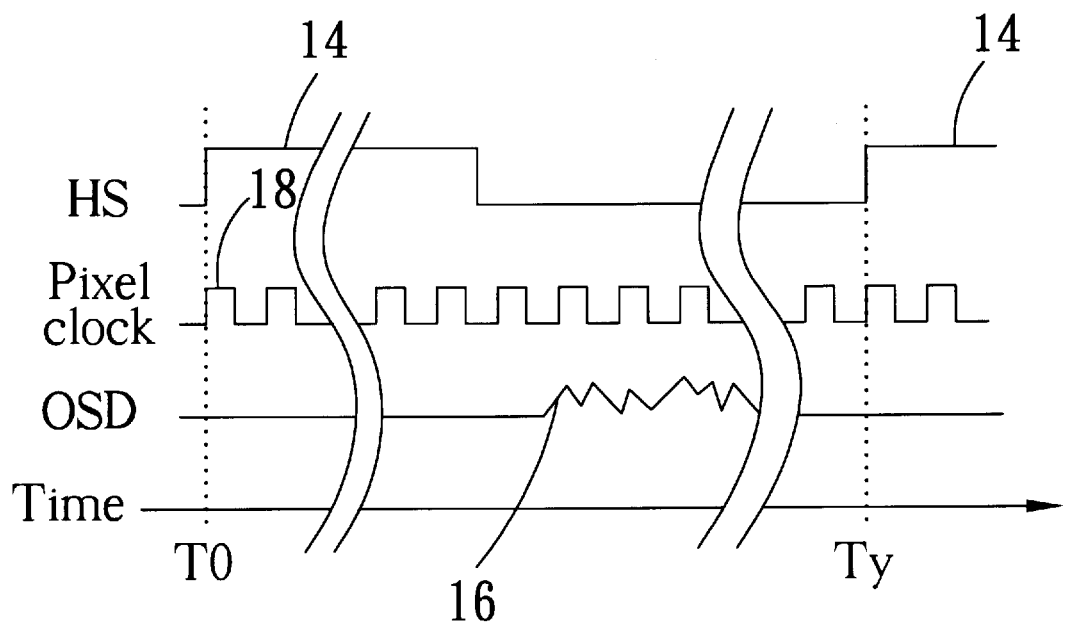
FIG. 2 is a schematic diagram of the time sequence of the pixel clock generator shown in FIG. 1.
Figure 3:
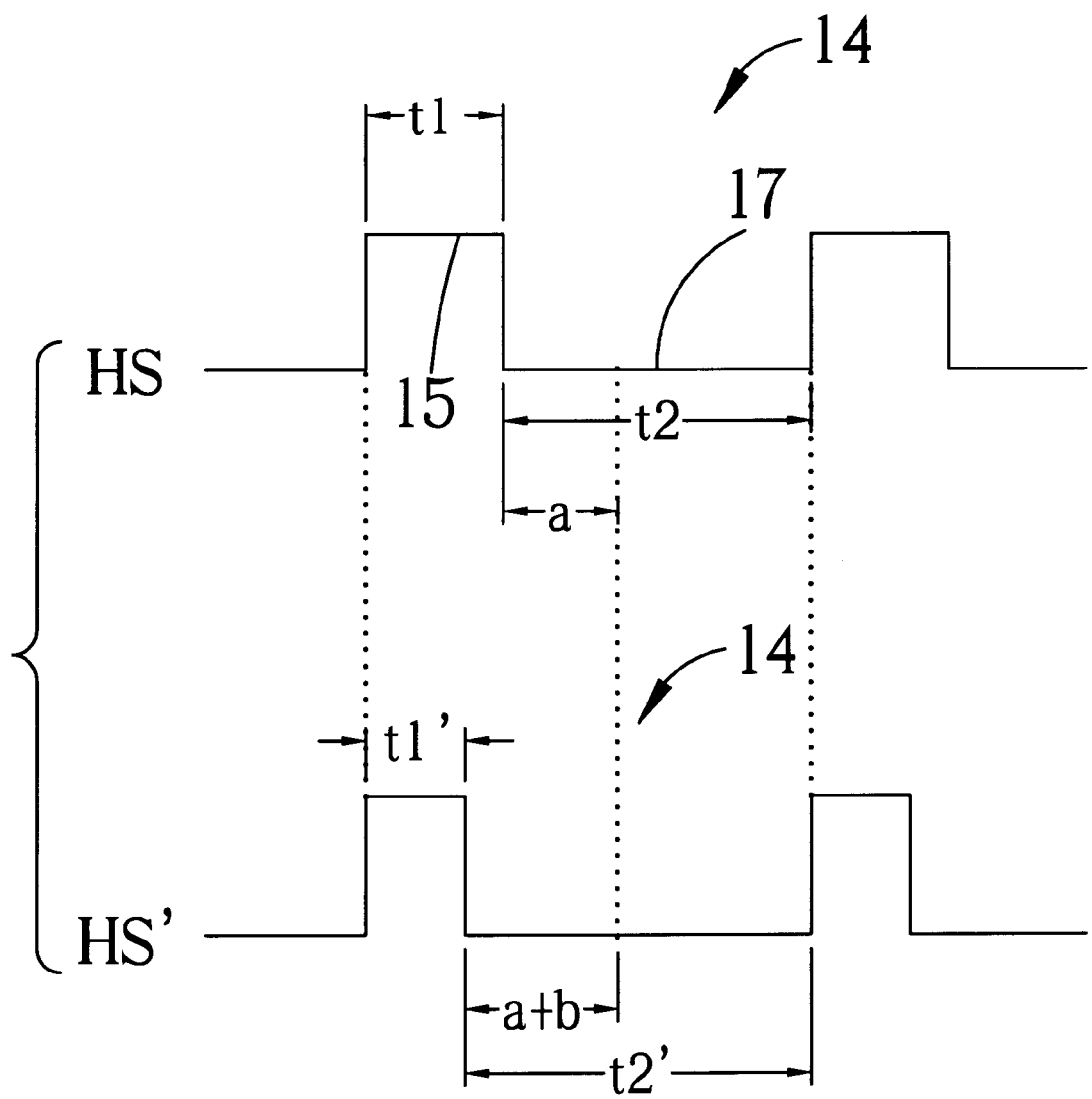
FIG. 3 is a schematic diagram of the time sequence of the retrace signals of the horizontal synchronous signals and the scan signals shown in FIG. 2.
Figure 4:
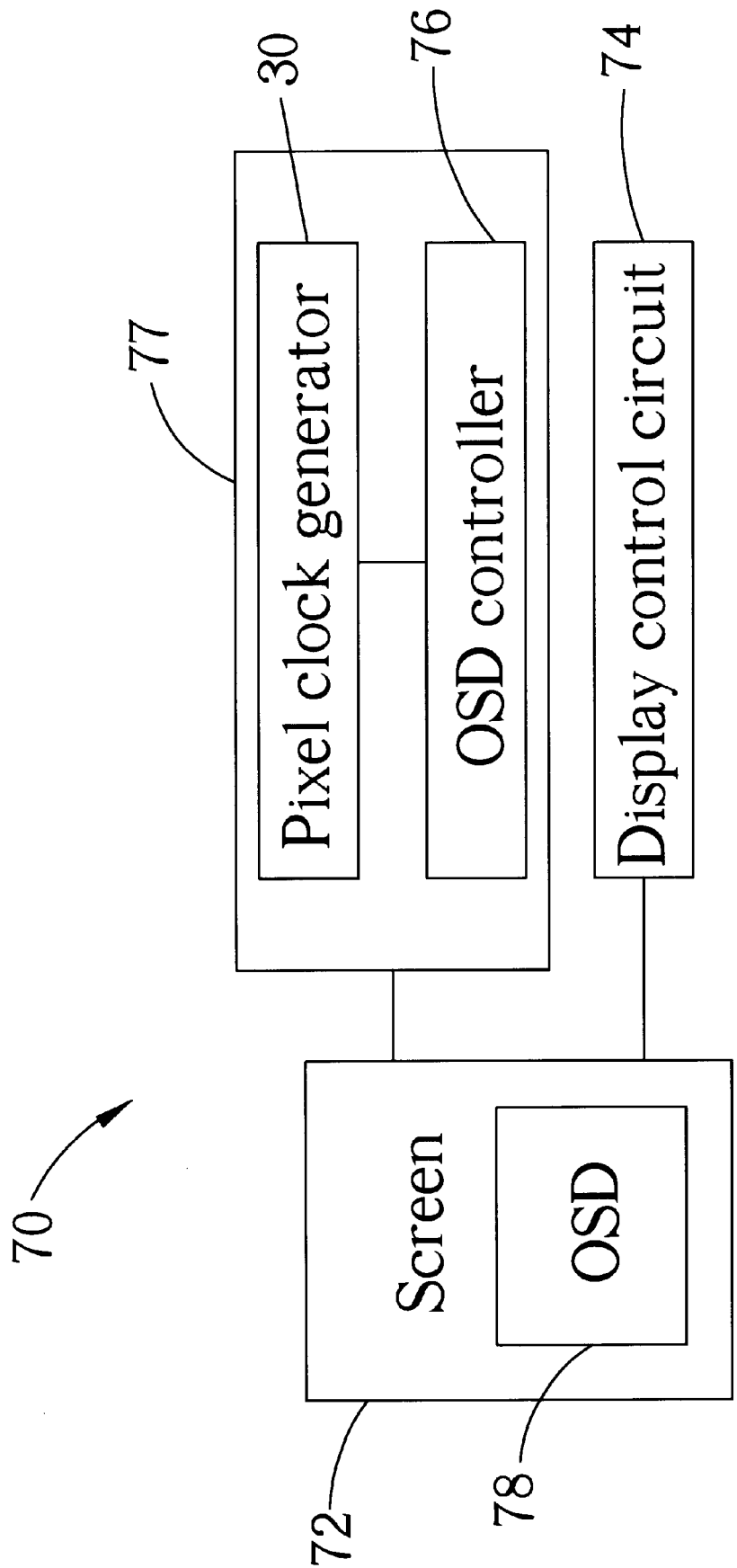
FIG. 4 is a block diagram of a pixel clock generator and a displaying device according to the present invention.
Figure 5:
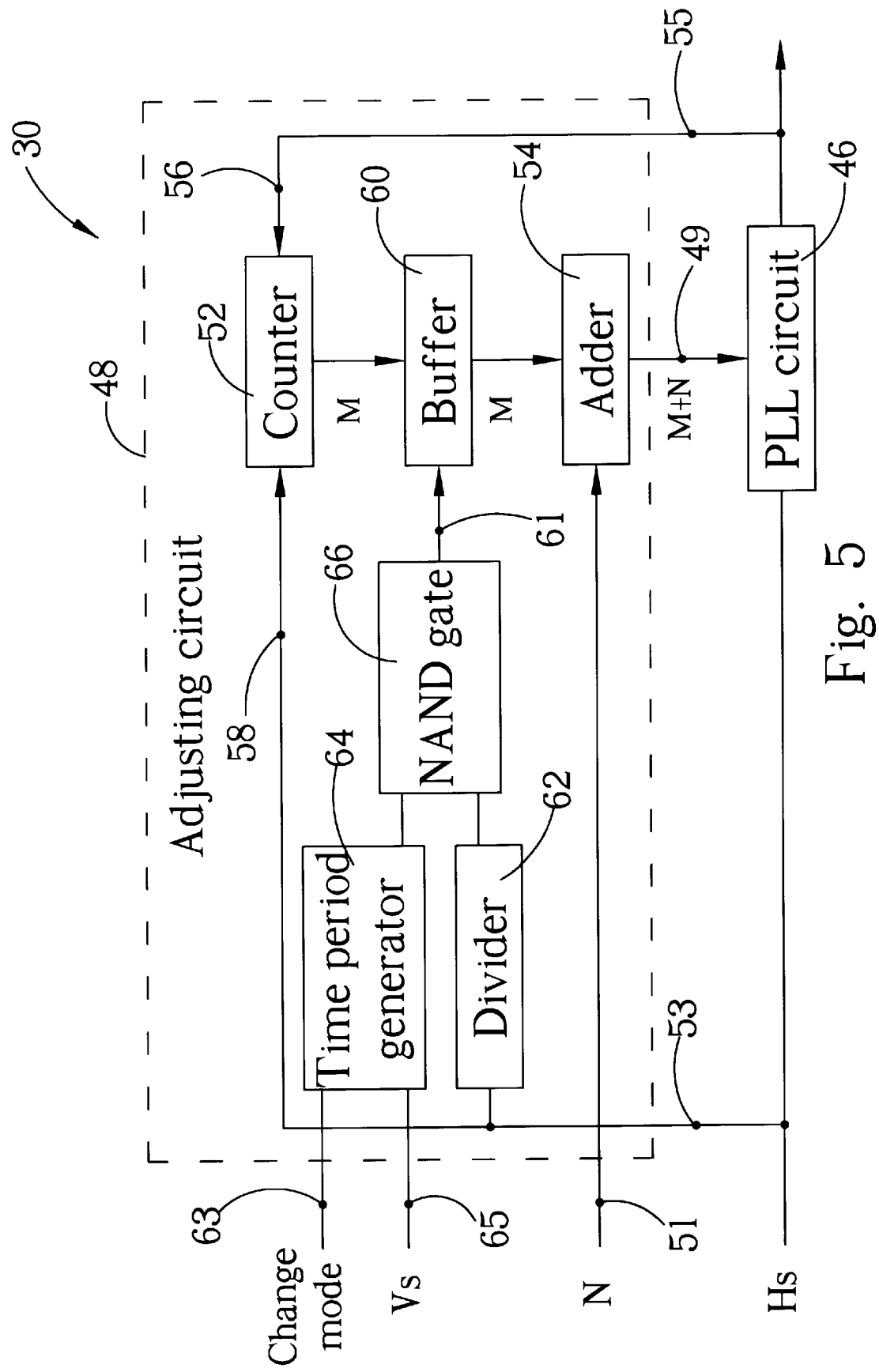
FIG. 5 is a functional block diagram of the pixel clock generator shown in FIG. 4.

Please refer to FIG. 4 and FIG. 5. FIG. 4 is a block diagram of a pixel clock generator 30 and a displaying device 70 according to the present invention. FIG. 5 is a functional block diagram of the pixel clock generator 30 shown in FIG. 4. The present invention is a pixel clock generator 30 for controlling the resolution of OSD horizontal image signals of a displaying device 70. The displaying device 70 comprises a screen 72 and a display control circuit 74 for displaying an on-screen-display (OSD) image frame on the screen according to an incoming on-screen-display (OSD) image frame signal. The OSD image frame signal comprises a plurality of horizontal synchronous signals and horizontal image signals. Each OSD image frame comprises a plurality of horizontal image lines, and each of the horizontal image signals forms one of the horizontal image lines of the OSD image frame. Each of the horizontal synchronous signals comprises a scan signal and a retrace signal. The scan signal directs the display control circuit 74 to convert one correspondent horizontal image signal into a horizontal image line on the screen 72. The retrace signal directs the display control circuit 74 to prepare for displaying another horizontal image line. The displaying device 70 further comprises an OSD controller 76 for displaying a predetermined square OSD image frame 78 on the screen 72. The pixel clock generator 30 and the OSD controller 76 are built on one semiconductor chip 77. The OSD controller 76 uses the pixel clocks outputted by the pixel clock generator 30 to control the position of each of the OSD image frames on the screen 72.

The pixel clock generator 30 comprises a phase locked loop circuit 46 and an adjusting circuit 48. The phase locked loop circuit 46 comprises a control port 49 for receiving a multiplier (i.e. amplification of rising frequency). The phase locked loop 46 can generate a quantity of pixel clocks approximately equal to the multiplier within the time period each of the horizontal synchronous signals (Hs) is received. The adjusting circuit has three input ports 51, 53, 55 for receiving a horizontal resolution value (N), the horizontal synchronous signals, and the pixel clocks generated by the PLL circuit 46. The multiplier fed into the control port 49 of the PLL circuit 46 is adjusted by the adjusting circuit 48 according to the horizontal synchronous signals to make the quantity of the pixel clocks 47 generated by the PLL circuit 46 within the receiving time period of each of the scan signals approximately equal to the horizontal resolution value (N).

The adjusting circuit 48 comprises a counter 52 and an adder 54. The counter 52 has an input port 56 for receiving the pixel clocks generated by the PLL circuit 46 and a control port 58 for receiving the horizontal synchronous signal. The counter 52 is used for calculating and outputting the quantity (M) of pixel clocks received during the receiving time period of one retrace signal. The adder 54 is used for adding the output (M) of the counter with the inputted horizontal resolution value (N) and outputting the sum (M+N) to the control port 49 of the PLL circuit 46 as its multiplier.

The adjusting circuit 48 further comprises a buffer 60, a divider 62, a time period generator 64, and a NAND gate 66. The buffer 60 is electrically connected between the output port of the counter 52 and the input port of the adder 54 for temporarily storing the quantity of the pixel clocks outputted by the counter 52 and feeding it into the adder 54. The buffer 60 comprises a control port 61 for initiating the buffer 60 to record the output (quantity of the pixel clocks) from the counter 52. The divider 62 receives the horizontal synchronous signals and generates a start signal for the control port 61 of the buffer 60 after receiving a predetermined quantity (for example 64 ones) of horizontal synchronous signals. This causes the buffer 60 to record the output (quantity of the pixel clocks) of the counter 52. The start signal prepares the time needed to synchronize the phase locked loop circuit 46 with the horizontal synchronous signals.

The time period generator 64 generates a time period signal with a predetermined time. This time period signal fixes the value of the buffer after the phase locked loop circuit 46 and the horizontal synchronous signal are synchronized. The time period generator 64 comprises two input ports 63, 65 each of which receives a Change Mode signal and a vertical synchronous signal (Vs). The two input ports of the NAND gate are used for receiving the time period signal outputted by the time period generator 64 and the start signal outputted by the divider 62. The output port is electrically connected to the control port 61 of the buffer 60. The start signal outputted by the divider 62 can be transmitted to the control port 61 of the buffer 60 only when the time period signal is generated by the time period generator 64. In practice, when the outputs of the time period generator 64 and the divider 62 are all high, the NAND gate 66 activates the buffer 60 so that the pixel clocks outputted by the counter 52 can be stored in the buffer 60.

Please refer to FIG. 6. FIG. 6 is the calculating formula of the pixel clock generator shown in FIG. 5, $t_1$ denotes the retracing time of the horizontal synchronous signals, $t_2$ denotes the scanning time of the horizontal synchronous signals, N denotes the horizontal resolution, value, $m_1$ to $m_n$ denote the quantity of the pixel clocks each time the pixel clock generator 30 reaches a stable state, M denotes the quantity of the pixel clocks when the pixel clock generator 30 achieves stability after a length of time. Formula (1) refers to the calculating procedure of the first stable state $m_1$, Formula (2) refers to the calculating procedure of the second stable state $m_2$, Formula (3) refers to the calculating procedure of the n-th stable state $m_n$, Formula (4) refers to the calculating procedure of the perfect stable state M after a length of time. Formula (4) and Formula (5) show that the resolution of the phase locked loop circuit $[(t_1+t_2)/N+M]$ is almost equal to the resolution of the OSD $(t_2/N)$ As shown in FIG. 5, the phase locked loop circuit 46 generates the pixel clocks after the horizontal synchronous signal is inputted and inputs the pixel clocks into the adjusting circuit 48. When the pixel clock generator 30 receives a change mode signal, the time period generator 64 generates a time period signal to output to the NAND gate 66 according to the change mode and the vertical synchronous signals. At the same time, the divider 62 calculates the received horizontal synchronous signal to generate a start signal and inputs the start signal into the buffer 60 via the NAND gate 66 so that the quantity of the pixel clocks outputted by the counter 52 can be stored into the buffer 60.

The counter 52 calculates the quantity ml of pixel clocks of the first stable state within the time period the retrace signal of the horizontal synchronous signals are received and inputs $m_1$ into the buffer 60. Then, the adder 54 adds $m_1$ and N and outputs the sum ($m_1$+N) to the phase locked loop circuit. The phase locked loop circuit 46 generates the second pixel clock according to the inputted multiplier ($m_1$+N) and the horizontal synchronous signals.

In the above procedure, the pixel clock generator 30 obtains the second, the n-th and the perfect stable state pixel clocks sequentially by iteration, then outputs them. Based on the fact that the resolution of the phase locked loop circuit is approximately equal to the resolution of the OSD, the horizontal resolution of the OSD screen in different modes can be automatically adjusted. The pixel clock generator 30 of the present invention uses circuitry to trigger and adjust the pixel clocks outputted by the phase locked loop circuit 46 when a predetermined point in time is reached such that the effect of the change of the retrace time may be compensated for by iteration. At different resolutions, the electron gun of the displaying device can still display the OSD screen at approximately the same position on the displaying device. Furthermore, under different modes, the initial display position of the OSD screen and the size of the OSD screen are fixed.

Compared to the pixel clock generator 20 of the prior art, the pixel clock generator 30 of the present invention provides an adjusting circuit 48 that adjusts the multiplier of the phase locked loop circuit 46 by iteration. This enables automatic compensation and adjustment of the outputted pixel clocks. The electron gun of the displaying device is controlled according to the adjusted pixel clocks and the originally determined initial position of the OSD screen. At different resolutions, the electron gun can still display the OSD screen at approximately the same position on the displaying device. The present invention not only solves the problem of having to adjust the OSD screen for different display manufacturers but also greatly reduces the complexity of the OSD program.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A pixel clock generator for controlling the resolution of horizontal image signals of a displaying device, the displaying device comprising a screen and a display control circuit for displaying an image frame on the screen according to an incoming image frame signal, each image frame comprising a plurality of horizontal image lines, the image frame signal comprising a plurality of horizontal synchronous signals and horizontal image signals, each of the horizontal image signals being used for forming one of the horizontal image lines of the image frame, each of the horizontal synchronous signals comprising a scan signal and a retrace signal, the scan signal being used for directing the display control circuit to convert one correspondent horizontal image signal into a horizontal image line on the screen, and the retrace signal being used for directing the display control circuit to prepare for displaying another horizontal image line, the pixel clock generator comprising:

a phase locked loop (PLL) circuit having an input port for receiving the horizontal synchronous signals and a control port for receiving a multiplier wherein the PLL circuit generates a quantity of the pixel clocks approximately equal to the multiplier within the receiving time period of each of the horizontal synchronous signals; and an adjusting circuit having three input ports for receiving a horizontal resolution value, the horizontal synchronous signals, and the pixel clocks generated by the PLL circuit wherein the adjusting circuit generates the multiplier fed into the control port of the PLL circuit according to the inputs from the three input ports to make the quantity of the pixel clocks generated by the PLL circuit within the receiving time period of each of the scan signals approximately equal to the horizontal resolution value.

2. The pixel clock generator of claim 1 wherein the adjusting circuit comprises:

a counter having an input port for receiving the pixel clocks generated by the PLL circuit and a control port for receiving the horizontal synchronous signal wherein the counter calculates and outputs the quantity of the pixel clocks received during the receiving time period of one retrace signal; and an adder for adding the output of the counter with the inputted horizontal resolution value and outputting the sum to the control port of the PLL circuit as its multiplier.

3. The pixel clock generator of claim 2 wherein the adjusting circuit further comprises:

a buffer electrically connected between the output port of the counter and the input port of the adder for temporarily storing the quantity of the pixel clocks outputted by the counter and feeding it into the adder, the buffer comprising a control port for initiating the buffer to record the output from the counter; and a divider for receiving the horizontal synchronous signals and generating a start signal to the control port of the buffer after receiving a predetermined quantity of the horizontal synchronous signals so as to initiate the buffer to record the output of the counter.

4. The pixel clock generator of claim 3 wherein the adjusting circuit further comprises:

a time period generator for generating a time period signal of a predetermined time length; and a NAND gate having two input ports and an output port, the two input ports being used for receiving the time period signal outputted by the time period generator and the start signal outputted by the divider, and the output port being electrically connected to the control port of the buffer;

wherein the start signal outputted by the divider can be transmitted to the control port of the buffer only when the time period signal is generated by the time period generator.

5. The pixel clock generator of claim 1 wherein the image frame signal is an on-screen-display (OSD) image frame signal and the display control circuit converts each of the OSD image frame signals into an OSD image frame displayed on the screen.

6. The pixel clock generator of claim 5 wherein the displaying device further comprises an OSD controller for displaying the OSD image frames on the screen and the pixel clock generator and the OSD controller are built in one semiconductor chip, wherein the OSD controller uses the pixel clocks outputted by the pixel clock generator to control the position of each of the OSD image frames on the screen.

* * * * *